Sept. 10, 1968  E. F. CIRIMELE ET AL  3,401,393
ELECTROGRAPHIC RECORDER EMPLOYING A MOVING STYLUS
Filed Sept. 6, 1966  2 Sheets-Sheet 1
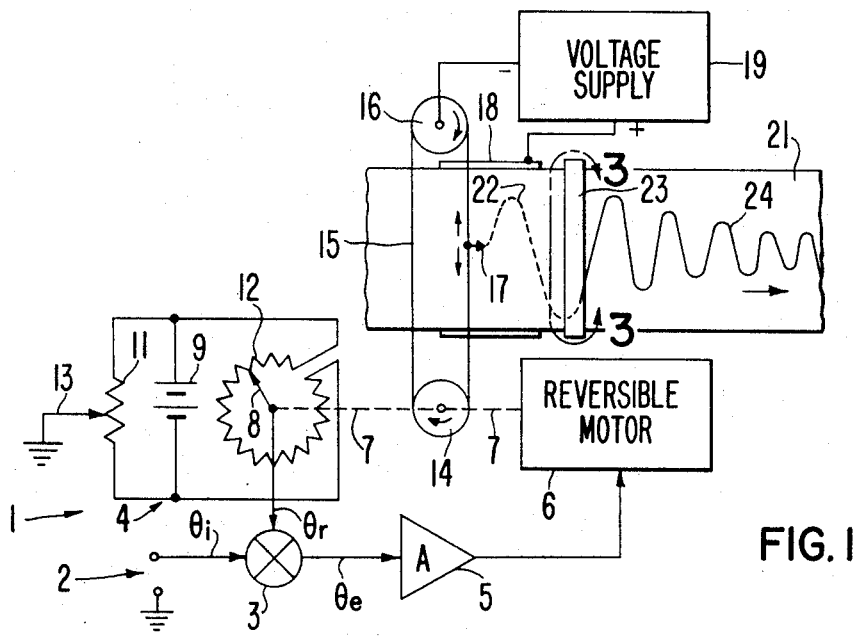
FIG. 1
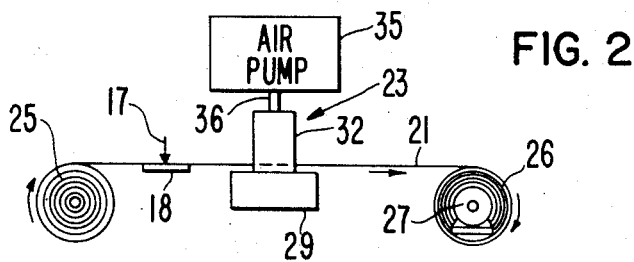
FIG. 2
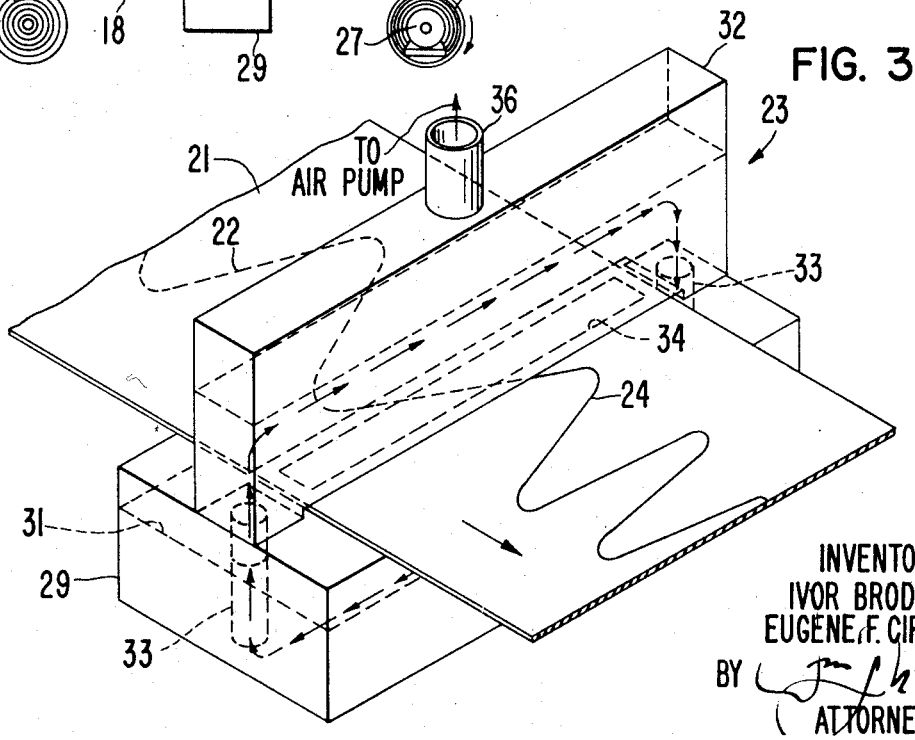
FIG. 3
INVENTORS
IVOR BRODIE
EUGENE F. CIRIMELE
ATTORNEY

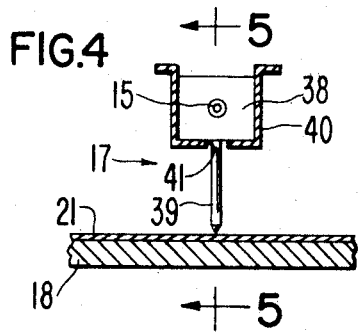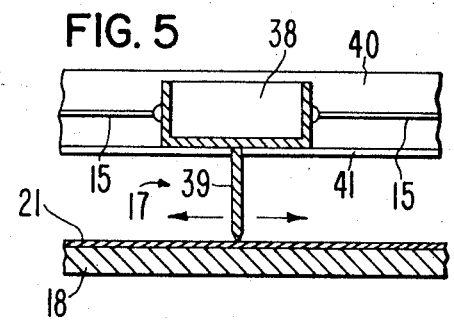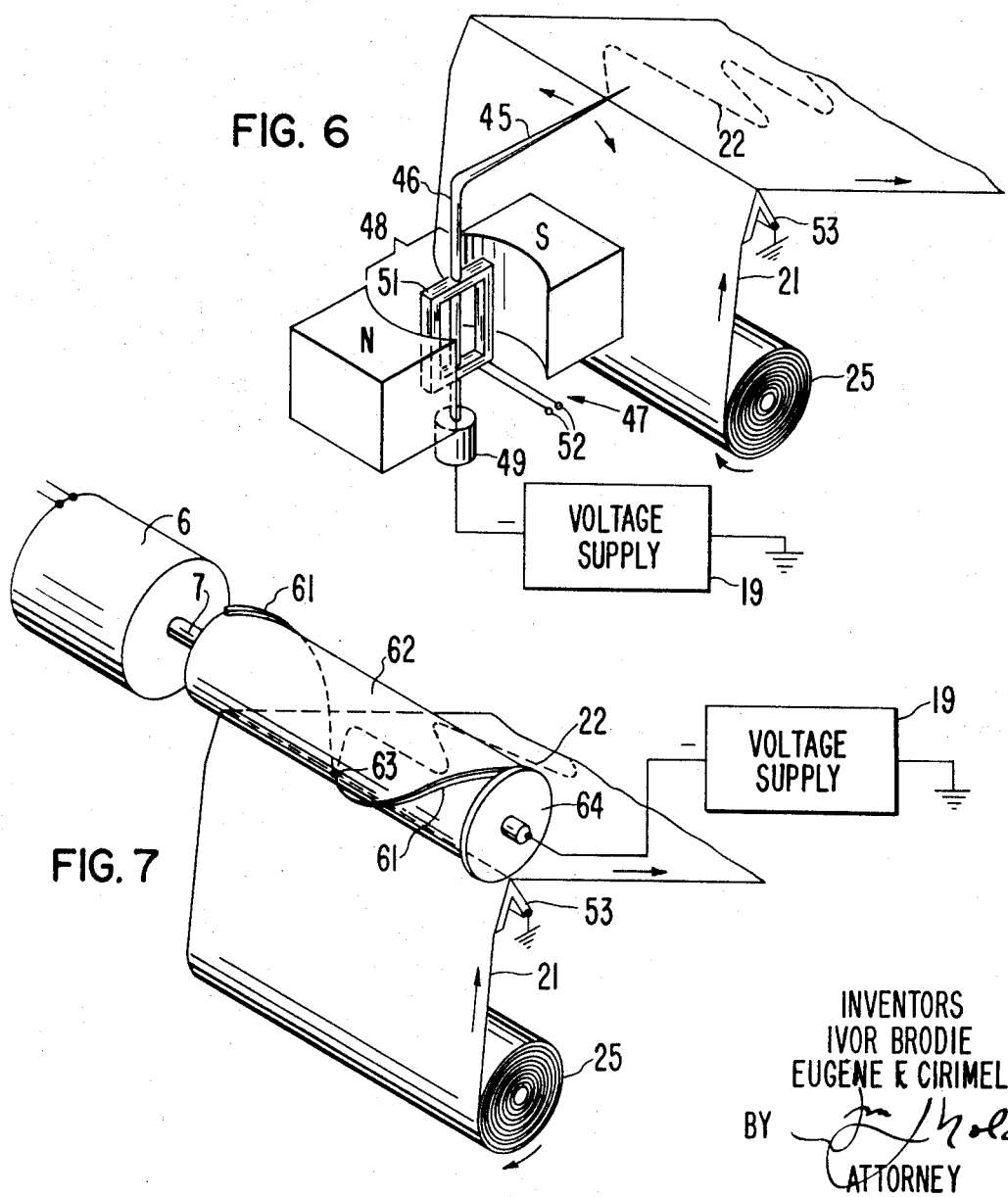

United States Patent Office 3,401,393
Patented Sept. 10, 1968

3,401,393
ELECTROGRAPHIC RECORDER EMPLOYING A
MOVING STYLUS
Eugene F. Cirimele, Sunnyvale, and Ivor Brodie, Palo
Alto, Calif., assignors to Varian Associates, Palo Alto,
Calif., a corporation of California
Filed Sept. 6, 1966, Ser. No. 577,436
7 Claims. (Cl. 346—32)

ABSTRACT OF THE DISCLOSURE

An electrographic recorder is disclosed. The recorder includes a movable writing electrode for depositing a line charge image upon the dielectric charge retentive surface of an electrographic recording paper in response to an input signal to be measured. The recording paper is drawn from a supply roll past the movable writing electrode to produce a strip chart type recording. The charge image on the recording paper is developed by passing the charge image over an inking slot in an inking channel. The ink comprises a slurry of pigment particles in a liquid vehicle which is supplied to the inking channel at less than atmospheric pressure to cause the recording paper to be drawn into contact with the liquid ink in the inking slot. The pigment particles are drawn out of the suspension in the liquid and deposited on the charge image, thereby developing same. Various mechanical arrangements are provided for moving the electrographic writing electrode over the recording paper. For example, a reversible motor, cable and pulley are employed in one embodiment. In another embodiment, a galvanometer movement is employed for moving the writing electrode. In another embodiment, a helical conductor is rotated in response to the input signal for causing the conductor to produce a trace on the recording paper.

Heretofore, strip chart graphic recorders have typically employed ink filled pens as the moving stylus of the recorder for writing on the chart paper. Such pens have limitations which it is desired to overcome. For example, the ink often dries in the pen producing clogging thereof. Also, if the ink flow is adjusted to write well at high writing speeds of the pen relative to the paper (obtained for example by increasing the chart speed) then the pen will tend to flood at low writing speeds. On the other hand if the ink flow is adjusted for low writing speeds then it will not write at all at high speeds. In any case, the ink flow sets a natural limit to the highest writing speed. Moreover, the pen writes with a fairly broad line due to the requirement of feeding ink to its writing point through a hollow tube forming the pen point.

Some of the problems associated with ink fed styli have been overcome by use of a hot wire stylus for writing on heat sensitive chart paper. The stylus in this case is light weight and writes with a fairly narrow line but the chart paper is relatively expensive and use of such hot wire styli are found typically in galvanometer type recorders.

Other attempts to avoid problems of the ink fed pen have been made by employing electrosensitive chart paper. Such papers work by passing a current into the paper from a moving stylus electrode. The current in one case burns through an opaque coating on the paper to expose an underlying color contrasting highly conductive layer, as of aluminum. Since the writing currents are relatively large the conducting layer must be highly conductive and adds to the cost of the paper. In another case the current produces a color change in the paper by electrochemical reaction. Such electrosensitive papers require very substantial writing currents and are subject to many of the limitations of the prior ink fed pens. For example, if the current is adjusted for slow writing speeds the recorded trace at fast writing speeds is faint or invisible. If the current is adjusted for high writing speeds the recorded trace is broad and indistinct at slow writing speeds.

In the present invention, the moving stylus of a graphic recorder deposits an electric line charge image on the dielectric surface of electrographic chart paper. The signal charge image is subsequently developed to form a visible image by applying to the image a positively charged finely divided pigment toner which may be in either air or dielectric liquid suspension. In a preferred embodiment of the present invention, the pigment toner is suspended in a quick drying dielectric liquid vehicle. The advantage of the recorder of the present invention is that the writing and inking steps of the recording process are separated such that the stylus can have a sharper writing point to provide a narrower line. Also the quantity of charge required to deposit a developable image is exceedingly small compared with the charge required by the writing processes employing electrosensitive papers. Hence, the writing speed can be greatly increased over any known ink fed pen or electrographic process employing a moving stylus. In addition, the electrographic chart paper is relatively inexpensive compared to the cost of the thermal or electrosensitive papers. Another advantage over ink fed pens is that if the charge image developer runs out of ink the latent charge image is not lost and can be developed later.

The principal object of the present invention is the provision of an improved electrographic recorder.

One feature of the present invention is the provision in graphic recorders of a moving writing electrode for depositing a line charge image on an electrographic recording medium for subsequent development, whereby the writing and inking functions are separated for providing narrower recorded lines and for increasing the writing speed of the recorder.

Another feature of the present invention is the same as the preceding feature wherein the electrographic recording medium comprises a dielectrically coated conductive paper with the line charge image being deposited on the dielectric coating.

Another feature of the present invention is the same as any one or more of the preceding features wherein the line charge image is developed by applying to the image a dielectric liquid carrying the inking pigment suspended therein, whereby the pigment is attracted to and bound to the charge image for developing same.

Another feature of the present invention is the same as any one or more of the preceding features wherein the moving writing electrode is operated at a negative voltage relative to a second electrode and disposed such that the electric field between the writing electrode and the second electrode passes into the electrographic paper to deposit the charge image.

Other features and advantages of the present invention will become apparent upon a perusal of the following specification taken in connection with the accompanying drawings wherein:

FIG. 1 is a schematic diagram of a graphic recorder embodying features of the present invention, FIG. 2 is a schematic diagram of the chart paper feed, take up and development features of the apparatus of FIG. 1, FIG. 3 is a perspective view of a charge image development apparatus of the type schematically depicted and delineated by line 3—3 in FIG. 1, FIG. 4 is a transverse sectional view of a stylus carriage assembly of the type employed in the structure of FIG. 1, FIG. 5 is a sectional view of the structure of FIG. 4 taken along line 5—5 in the direction of the arrows.

FIG. 6 is a schematic perspective view of an alternative galvanometer type stylus electrographic writer useful in the recorder of FIG. 2, and FIG. 7 is an alternative moving electrode writer embodiment to that shown in FIG. 6.

Referring now to FIG. 1, there is shown a null balance potentiometer type graphic recorder 1 incorporating features of the present invention. The recorder 1 includes a pair of input terminals 2 to which is supplied the input signal voltage $\theta i$ to be recorded. The input signal $\theta i$ is fed to one input of an error detector circuit 3 wherein it is compared with a reference voltage $\theta r$ derived from a potentiometer 4 to produce a difference or error signal $\theta_e$ which is fed to an amplifier 5. The output of the amplifier is fed to a reversible motor 6 for driving an output shaft 7 of the motor in a direction in response to the sense of the error signal $\theta_e$.

The output shaft 7 of the motor 6 is coupled to the pickoff electrode 8 of the potentiometer circuit 4. The reference voltage $\theta r$, picked up by pickoff 8, is fed back to the error detector 3. Thus, the motor 6 drives the pickoff 8 around until the reference voltage $\theta r$ cancels the input signal $\theta i$ at which time the error signal is of zero amplitude and the closed loop servo system is thus in a condition of null balance.

The potentiometer circuit 4 includes a voltage source 9 which is parallel connected with a pair of potentiometers 11 and 12. The pickoff 13 of the potentiometer 11 is preferably grounded to form a zero reference voltage for the potentiometer circuit 4 and for the recorder 1 since one of the input terminals 2 is also grounded.

An insulated stylus carriage drive wheel 14 is also coupled to the output shaft 7 of the motor 6. A conductive closed loop cable drive 15 is wound around the drive wheel 14 and around a conductive idler wheel 16. A stylus or writing electrode 17, more fully described below, is affixed to the cable 15 intermediate the wheels 14 and 16. A second electrode 18, preferably in the form of a conductive plate, is disposed below the stylus 17. A voltage supply 19 is connected between the conductive idler wheel 16 and the second electrode plate 18 to apply a negative voltage, as of $-300$ to $-1000$ volts, to the stylus 17 relative to the electrode plate 18.

An electrographic chart paper or web 21 is passed over the electrode plate 18 in between the stylus 17 and the plate 18. The paper 21 is drawn from a supply roll, not shown in FIG. 1 but described in FIG. 2, past the stylus 17. The electrographic paper or web 21 is marketed by Crown Zellerbach and Plastic Coating Corporation and comprises a slightly conductive paper with a thin dielectric film on one side. The dielectric film side of the paper is positioned adjacent the stylus electrode 17 and the conductive backing is placed in contact with the second electrode plate 18.

As the stylus 17 passes to and fro across the moving chart paper 21, in response to the signal to be recorded, it causes a line of charge 22 to be deposited on the dielectric film. This line of charge is rendered visible at 24 by passing the paper 21 through an inker or developer 23 which causes minute pigment particles in a fluid suspension of air or dielectric liquid to be attracted out of suspension and electrostatically bound to the line of charge 22. In a preferred embodiment of the present invention, a liquid colloidal suspension of pigment particles is used for development since the image is fixed merely by drying of the paper 21 after passage through the developer or inker 23. A preferred inker 23 is more fully described below with regard to FIGS. 2 and 3.

The advantages of the electrographic movable stylus method of recording, as described, stem from the fact that the inking function is separated from the writing function of the stylus 17. Thus, the maximum writing speed is not limited by the rate at which ink can be fed through the stylus. In addition, the stylus 17 can have a finer point to produce a narrower line 24 because the stylus point does not have to accommodate an ink tube. Moreover, the stylus point does not need to make physical contact with the paper 21 as a line of charge 22 will be deposited without physical contact. Thus, the drag and inertia of the stylus 17 can be reduced compared to a prior ink fed stylus.

The separate inking function may be carried out with brush, wick, inking channel, or roller systems usilng a conventional liquid toner without any undue impedance to ink flow or risk of clogging. Writing and full development at chart speeds up to 40 inches per second are easily achieved.

Referring now to FIGS. 2 and 3 the inking or development of the charge image will be more fully described. The chart paper 21 is drawn from a supply roll 25 by a take up roll 26 (or by motor driven friction wheels, not shown) which is rotated at a desired speed by a motor 27. The paper 21 passes between the stylus electrode 17 and the second electrode 18 for depositing the line of charge 22 on the paper 21. The paper 21 is then fed through the inker 23. The inker 23 may take various forms. However, a preferred form is shown and is also described and claimed in copending U.S. patent application 577,443 filed Sept. 6, 1966 and assigned to the same assignee as the present invention.

The preferred inker 23 comprises a closed reservoir chamber 29 filled with a liquid electrographic toner 31. A suitable toner 31 is formed by a concentrate of finely divided powder pigment in a liquid vehicle which in turn forms 2 to 4% by volume of a mixture of the concentrate in a dielectric liquid vehicle such as Shell Chemical Company's number 72 solvent. The concentrate toner is marketed by Philip A. Hunt Company. A hollow inking channel 32 is disposed above the reservoir 29. A pair of tubes 33 depend from the inking channel into the reservoir 29 and provide a pair of liquid communication passageways between the hollow interior of the inking channel 32 and the reservoir 29. An elongated inking slot 34 extends along the bottom side of the inking channel 32 and provides an opening from the interior of the inking channel 32 to the outside atmosphere. The suction side of an air pump 35 is connected into the top of the inking channel 32 via an exhaust tubulation 36. The chart paper 21 to be inked (developed) is drawn through the inker 23 adjacent the inking slot 34. The chart paper 21 is wider than the length of the inking slot 34.

The suction of the air pump reduces the air pressure on the inking channel 32 causing the chart paper to be drawn up against the marginal edges of the inking slot 34 to form an air seal. The reduced air pressure in the channel 32 also causes ink to be drawn from the reservoir 29 through tubes 33 up into the inking channel 32 to a predetermined level above the level of the inking slot 34. As the chart paper is drawn across the inking slot 34 the line charge image 22 on the dielectric film attracts pigment particles out of suspension to the areas of the line charge 22. The pigment is electrostatically bound to the line charge image thereby rendering same visible. The trailing marginal edge of the inking slot 34 serves as a squeegee for removing excess liquid from the chart paper 21 without disturbing the developed image 24. The moist paper 21 dries quickly, thereby fixing the recorded signal 24 on the chart paper 21.

A circulation of ink from the reservoir 29 to the inking channel 32, as indicated by the arrows, is obtained by introducing a stream of air bubbles into one of the depending tubes 33. The circulation of ink serves to renew the supply of pigment to the inking slot 34. A suitable suction on the chart paper 21, as produced at the inking slot 34, falls within the range of minus 3 to minus 15 inches of water. A pressure regulator valve, not shown, assures the proper pressure in the inker 23. A float controlled air by-pass valve, not shown, disposed between the inking channel 32 and the reservoir assures the proper liquid level in the inking channel 32.

Referring now to FIGS. 4 and 5, there is shown a suitable stylus electrode 17 and stylus carriage. More specifically, the stylus electrode 17 comprises a rectangular hollow metal block 38 having a metallic pin 39 as of hardened steel or tungsten carbide dependent therefrom. The lower end of the pin 39 is sharpened to a fine point which may ride lightly on the surface of the dielectric film of the chart paper 21 or which may ride a few ten thousandths of an inch above the surface of the chart paper 21. The rectangular block 38 rides inside a conductive channel member 40, as of stainless steel, having a slot 41 in the bottom thereof through which the pin 39 projects. The drive cable 15, as of stranded stainless steel wire, is connected to opposite ends of the block 38 for pulling the stylus 17 to and fro in the channel 40. The operating potential is applied to the stylus 17 via the idler wheel 16, cable 15 and block 38. Alternatively, the channel member 40 could have the potential applied thereto, in which case the cable 15, and idler wheel 16 could be made of insulating material.

Referring now to FIG. 6, there is shown an alternative embodiment of the present invention. In this embodiment, the stylus moving mechanism is a galvanometer. More specifically, a stylus electrode 45 is carried at right angles from a rotatable shaft 46 of a galvanometer 47. The galvanometer includes a magnet having a gap 48 defined between the N and S poles of the magnet, only partially shown. The shaft 46 passes through the gap 48 and is carried from a bearing assembly 49. A coil of wire 51 having a multitude of turns is affixed to the shaft 46 in the gap 48. The leads of the coil 51 are brought out to a pair of input terminals 52 to which is applied the signal to be recorded. The writing potential is applied to the stylus 45 via shaft 46 from the negative voltage supply 19.

The electrographic chart paper 21 is drawn by a motor driven friction wheel or take up roll, not shown, from its supply roll 25 over a relatively sharp conductive ridge member 53 forming the second electrode of the stylus 45. The ridge member 53 is grounded and, thus, operates at a positive potential relative to the stylus 45.

In operation, the input signal to be recorded and as applied to the input terminals 52 causes the galvanometer shaft 46 to turn and, thus, swing the stylus 45 back and forth across the chart paper 21 at the ridge 53. As before, the stylus may ride either directly on the dielectric film of the paper 21 or may ride a few ten thousandths of an inch above the paper 21. The stylus 45 deposits a line charge image 22 on the paper 21 in response to the input signal to be recorded. The line charge image is developed as hereinbefore described.

Referring now to FIG. 7, there is shown an alternative writing electrode embodiment of the present invention. In this embodiment the chart paper 21 is pulled over a ridge 53 as in FIG. 6 and the moving writing electrode is formed by a raised helical conductive ridge 61 carried on the outside wall of a dielectric cylindrical support tube 62. The tube 62 is coupled to the drive shaft 7 of the reversible motor 6 or, alternatively, to the galvanometer shaft 46, for turning the tube 62 in response to the input signal to be recorded. The helical writing electrode 61 rides on the chart paper 21 at the point of intersection 63 of the helix 61 with the ridge of the underlying second electrode 53. As the helical writing electrode 61 is turned in response to the signal, the effective writing point 63 of the helix 61 is caused to move back and forth across the chart paper parallel to the writing ridge 53 to deposit a line charge trace 22 thereon in accordance with the signal being recorded. The writing potential is supplied to the helix 61 from the voltage supply 19 via a conductive disc contact 64 forming an end wall of the tube 162. The deposited line charge image is developed as hereinbefore described.

Although the preferred embodiment of present invention has been described using a negative writing potential applied to the writing electrode relative to the second electrode potential for depositing a negative charge image this is not a requirement. In an alternative embodiment, the writing potential may be positive relative to the second electrode potential to produce a positive charge image. In this latter case, a negatively charged colloidal suspension of pigment would be employed for developing the latent charge image on the recording web. It turns out that the charge on the colloidally suspended pigment particles can be either positive or negative depending upon the nature of the dispersing agent used in preparation of the colloidal suspension of the pigment in the dielectric vehicle.

While the writing potentials used herein are relatively high, i.e., 300 to 1000 volts, these potentials are not hazardous to operating personnel because the writing current requirements are extremely low, i.e., on the order of $10^{-8}$ amps. Thus, a very high internal impedance power supply 19 is employed which prevents injury to operating personnel in case they should come in contact with the writing potential.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A graphic recorder apparatus including, means forming an input terminal for receiving signals to be recorded, means forming a movable writing electrode having an effective writing portion operable upon a dielectric writing surface, means for moving said writing electrode in response to the received input signals such that the effective writing portion of said writing electrode is moved in a direction parallel to the writing surface, means forming a second electrode spaced from said movable writing electrode, means for applying an electical potential between said writing electrode and said second electrode for depositing an electrostatic line charge image on the dielectric writing surface of an electrographic recording web disposed adjacent said writing electrode, means for developing the line charge image on the recording medium by depositing pigment particles on the line charge image to produce a visible recording of the signal received by said input terminal, means forming a storage roll of the electrographic recording web, means for drawing said recording web from said storage roll past said movable writing electrode to form a strip chart recording, and wherein said means for developing the line charge image includes, an inking channel having an inking slot along one side thereof with said inking slot disposed adjacent to and facing the line charge image to be developed on the recording web, means forming a source of liquid ink, said liquid ink being comprised of a liquid vehicle carrying a suspension of pigment particles, means for drawing said liquid ink from said source into said inking channel at less than atmospheric pressure to sauce the recording web having the charge image thereon to be drawn into contact with the liquid ink in said inking slot for developing the recorded signals, and means for drawing said web past said inking slot.

2. The apparatus of claim 1 wherein said electrographic recording web is drawn in between said writing electrode and said second electrode.

3. The apparatus of claim 1 wherein said electrographic recording web comprises a conductive paper web having a dielectric film on the surface thereof which is disposed adjacent said writing electrode.

4. The apparatus of claim 3 wherein said means for applying an electrical potential between said writing electrode and said second electrode applies a negative potential in excess of 300 volts to said writing electrode relative to said second electrode.

5. The apparatus of claim 1 including, an error detector circuit, a potentiometer having a movable pickoff for deriving an output voltage for balancing against the input signal to be recorded in said error detector circuit to produce a null balance, a motor responsive to the unbalance output of said error detector for driving said movable pickoff of said potentiometer for changing the output voltage of said potentiometer, and a writing electrode drive mechanism coupled to said movable pickoff of said potentiometer for moving said writing electrode.

6. The apparatus of claim 1 wherein said movable writing electrode is a rotatable helical conductor.

7. A graphic recorder apparatus including, means forming an input terminal for receiving signals to be recorded, means forming a movable writing electrode having an effective writing portion operable upon a dielectric writing surface, means for moving said writing electrode in response to the received input signals such that the effective writing portion of said writing electrode is moved in a direction parallel to the writing surface, means forming a second electrode spaced from said movable writing electrode, means for applying an electical potential between said writing electrode and said second electrode for depositing an electrostatic line charge image on the dielectric writing surface of an electrographic recording medium disposed adjacent said writing electrode, and means for developing the line charge image on the recording medium by depositing pigment particles on the line charge image to produce a visible recording of the signal received by said input terminal, and wherein said means for moving said writing electrode in response to the received input signal includes a galvanometer mechanism.

References Cited

UNITED STATES PATENTS

| 2,639,964 | 5/1953 | Keinath | 346—33 |
| 2,683,111 | 7/1954 | Greig | 346—101 |
| 2,967,082 | 1/1961 | Epstein | 346—35 |
| 2,985,728 | 5/1961 | Macune | 346—32 |

RICHARD B. WILKINSON, *Primary Examiner.*

E. C. SIMMON, *Assistant Examiner.*